US012645857B1

(12) United States Patent
Thiel

(10) Patent No.: US 12,645,857 B1
(45) Date of Patent: Jun. 2, 2026

(54) SYSTEMS AND METHODS FOR BLENDING AC AND DC MODELS FOR ELECTROMAGNETIC SIMULATION

(71) Applicant: Ansys, Inc., Canonsburg, PA (US)

(72) Inventor: Werner Thiel, Sewickley, PA (US)

(73) Assignee: ANSYS, INC., Canonsburg, PA (US)

( * ) Notice: Subject to any disclaimer, the term of this patent is extended or adjusted under 35 U.S.C. 154(b) by 1030 days.

(21) Appl. No.: 17/834,995

(22) Filed: Jun. 8, 2022

Related U.S. Application Data

(60) Provisional application No. 63/338,587, filed on May 5, 2022.

(51) Int. Cl.
  *G06F 30/30* (2020.01)
  *G06F 30/367* (2020.01)
  *G06F 119/06* (2020.01)

(52) U.S. Cl.
  CPC ........ *G06F 30/367* (2020.01); *G06F 2119/06* (2020.01)

(58) Field of Classification Search
  CPC ........................... G06F 30/367; G06F 2119/06
  See application file for complete search history.

(56) References Cited

U.S. PATENT DOCUMENTS

| | | | |
|---|---|---|---|
| 8,682,625 B2 | 3/2014 | Liu et al. | |
| 11,063,472 B1 * | 7/2021 | Ashrafi | G06F 17/11 |
| 2004/0031001 A1 * | 2/2004 | Zhang | G06F 30/367 |
| | | | 716/113 |
| 2008/0317171 A1 * | 12/2008 | Jungerman | H04L 27/38 |
| | | | 375/323 |

* cited by examiner

*Primary Examiner* — Jack Chiang
*Assistant Examiner* — Brandon Bowers
(74) *Attorney, Agent, or Firm* — Vorys, Sater, Seymour and Pease LLP; Khaled Shami

(57) ABSTRACT

Systems and methods are provided for A computer-implemented method for simulating behavior of an electrical circuit across a range of frequencies from 0 to $f_{max}$. A base function is determined that outputs magnitudes across the range of frequencies. A correction function is determined that outputs magnitudes across the range of frequencies. The base function is combined with the correction function to generate a circuit behavior model that provides magnitudes across the range of frequencies. Behavior of the electrical circuit is simulated using the circuit behavior model.

20 Claims, 10 Drawing Sheets

Pair of Cauchy pulses

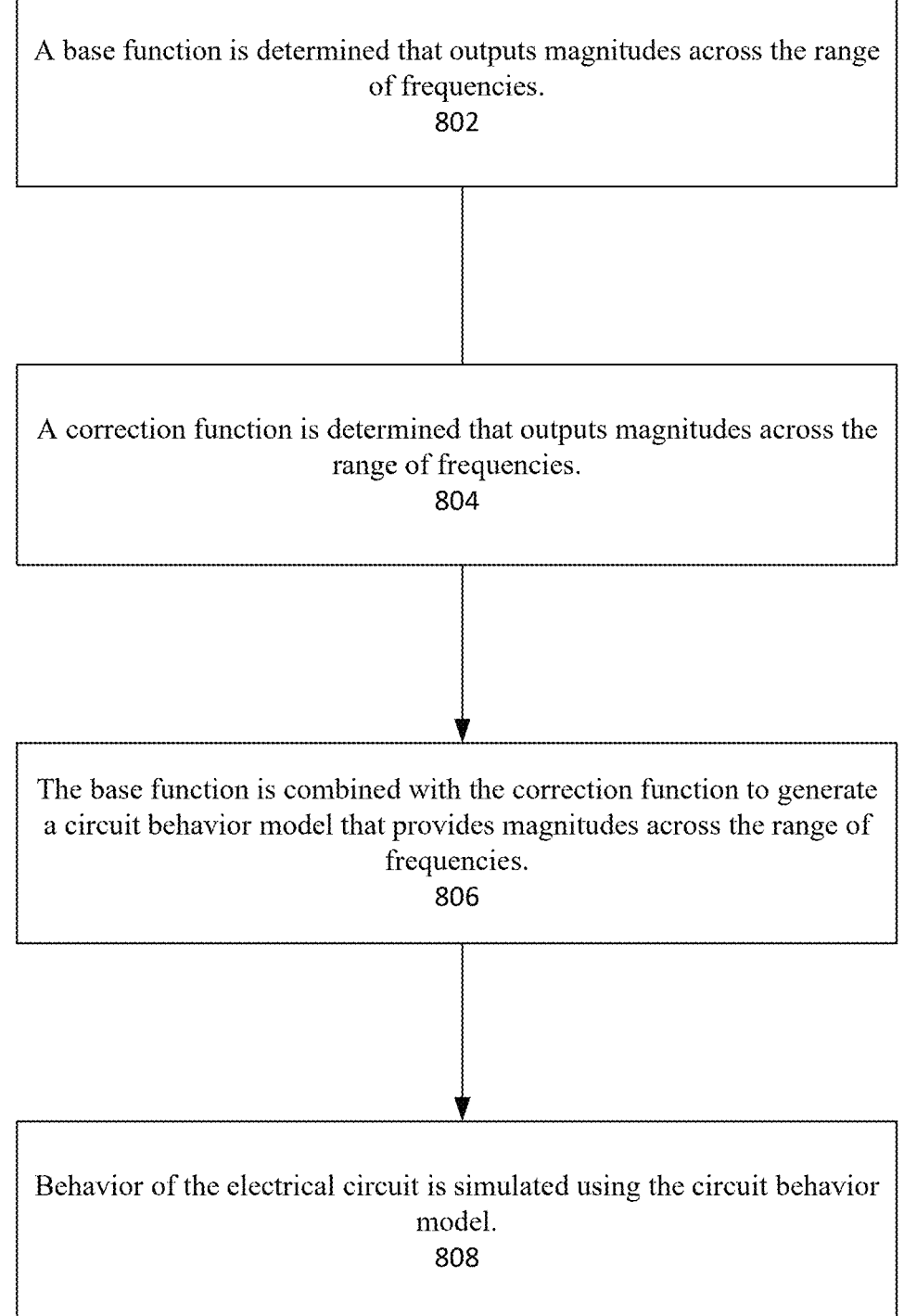

A base function is determined that outputs magnitudes across the range of frequencies.
802

A correction function is determined that outputs magnitudes across the range of frequencies.
804

The base function is combined with the correction function to generate a circuit behavior model that provides magnitudes across the range of frequencies.
806

Behavior of the electrical circuit is simulated using the circuit behavior model.
808

FIG. 8

SYSTEMS AND METHODS FOR BLENDING AC AND DC MODELS FOR ELECTROMAGNETIC SIMULATION

CROSS-REFERENCE TO RELATED APPLICATIONS

This application claims priority to U.S. Provisional Application No. 63/338,587, filed May 5, 2022, which is incorporated herein by reference in its entirety.

FIELD

This disclosure is related generally to physical system simulation and more particularly to simulation of an integrated circuit, integrated circuit package, or printed circuit board design.

BACKGROUND

High-speed integrated circuit, integrated circuit package, and printed circuit board design benefits from accurate power and signal integrity (PI/SI) analysis (e.g., to identify parasitics, S-parameters). Fast analysis turnaround time enables designers to study what-if scenarios throughout the design cycle, which can help in meeting tightly-managed product schedules. Broadband analysis involves extraction of S-parameters over a multi-GHz range, often requiring long computation times to determine a solution (e.g., hours, days, or longer). In many instances, it is desirable to provide accurate simulation results across the entirety of that large frequency range, including to low frequencies or all of the way to DC.

SUMMARY

Systems and methods are provided for a computer-implemented method for simulating behavior of an electrical circuit across a range of frequencies from 0 to $f_{max}$. A base function is determined that outputs magnitudes across the range of frequencies. A correction function is determined that outputs magnitudes across the range of frequencies. The base function is combined with the correction function to generate a circuit behavior model that provides magnitudes across the range of frequencies. Behavior of the electrical circuit is simulated using the circuit behavior model.

As another example, a computer-implemented system for simulating behavior of an electrical circuit across a range of frequencies from 0 to $f_{max}$ includes one or more data processors and a computer-readable medium encoded with instructions for commanding the one or more data processors to execute steps. In an example, those steps include determining a base function that outputs magnitudes across the range of frequencies. A correction function is determined that outputs magnitudes across the range of frequencies. The base function is combined with the correction function to generate a circuit behavior model that provides magnitudes across the range of frequencies. Behavior of the electrical circuit is simulated using the circuit behavior model.

As a further example, a computer-readable medium is encoded with instructions for commanding one or more data processors to execute steps of a method for simulating behavior of an electrical circuit across a range of frequencies from 0 to $f_{max}$. In an example, those steps include determining a base function that outputs magnitudes across the range of frequencies. A correction function is determined that outputs magnitudes across the range of frequencies. The base function is combined with the correction function to generate a circuit behavior model that provides magnitudes across the range of frequencies. Behavior of the electrical circuit is simulated using the circuit behavior model.

DESCRIPTION OF DRAWINGS

FIG. 8 is a diagram depicting example steps of a computer-implemented method for simulation.

DETAILED DESCRIPTION

System and methods as described herein provide techniques for, in embodiments, improving speed performance and accuracy of simulation model generation and operation. High frequency electromagnetic solvers provide highly accurate scattering parameters (S-parameters) for characterizing the behavior of electrical systems at high frequencies (AC) (e.g., frequencies in the kHz, MHz, GHz ranges and beyond). For example, Ansys HFSS provides a 3D electromagnetic simulation software solution for designing and simulating high-frequency electronic products such as antennas, antenna arrays, RF or microwave components, high-speed interconnects, filters, connectors, IC packages, and printed circuit boards. While such high-frequency solvers provide good AC results, their simulation of circuits operating at low frequency (DC) (e.g., frequencies less than 1,000 Hertz, including 0) tend to be less accurate. Specialized DC solvers can provide accurate scattering parameters at DC. But simulations of circuits based on output from those DC solvers tend to not perform well at AC frequencies.

Systems and methods as described herein that, in embodiments, blend outputs of a high frequency simulation tool that provides strong characterization of AC behavior with a DC model that accurately characterizes low frequency behavior to generate a circuit behavior model that provides accurate results across a full range of frequencies (e.g., from DC (e.g., 0) to AC (e.g., $f_{max}$). In embodiments, a blended model retains causality and passivity such that the physics of the electrical circuit are retained, impedance parameters are unchanged, and the effects of lumped elements (e.g., low frequency resonances) are accurately preserved, providing a high degree of confidence in the accuracy of simulation results.

In one example, this is accomplished by generating a causal correction function across the entirety of the frequency range that accounts for both the real and imaginary aspects of the circuit behavior. This correction function is combined with a base function (e.g., a base function provided by a high frequency solver) to generate a circuit behavior model that provides output across the frequency range. Behavior of the electrical circuit can then be simulated using the circuit behavior model.

Figure 1:
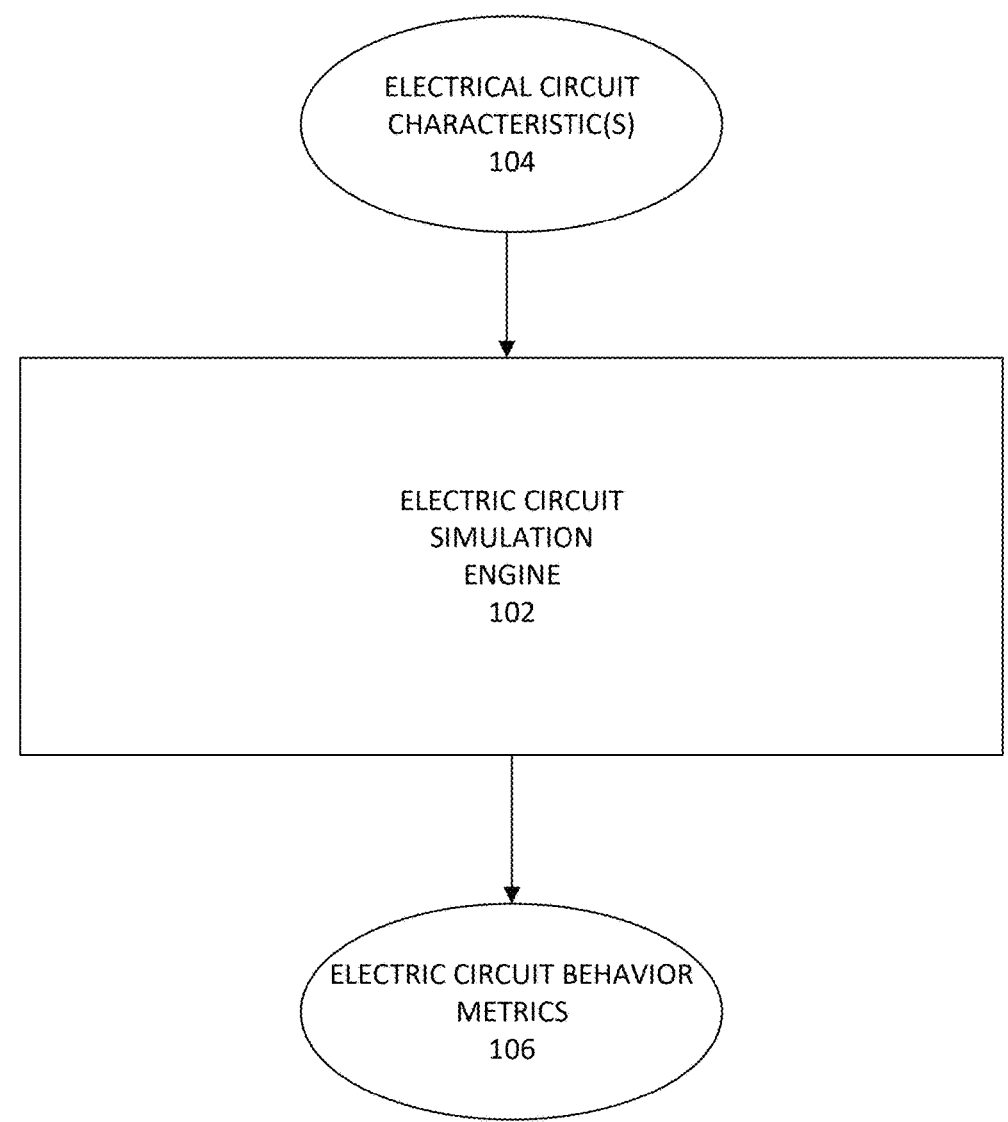
FIG. 1 is a block diagram depicting a computer-implemented electrical circuit simulation engine.

FIG. 1 is a block diagram depicting a computer-implemented electrical circuit simulation engine. An electrical circuit simulation engine 102 receives one or more characteristics 104 of an electrical circuit to be analyzed. The characteristics may take a variety of forms including the number and type of components, characteristics of the components (e.g., resistance, capacitance, inductance), the interconnections among those components, and the physical arrangement of those components (e.g., in an integrated circuit). Many different types of electrical circuits can be analyzed by the electrical circuit simulation engine 102 including antennas, antenna arrays, RF or microwave components, high-speed interconnects, filters, connectors, IC packages, and printed circuit boards.

The electrical circuit simulation engine 102 receives the electrical circuit characteristics 104 and generates a circuit behavior model that characterizes behavior of the circuit across a range of frequencies. In one example, the circuit behavior model accurately simulates a circuit parameter 106 (e.g., admittance) across a frequency range from DC to AC (e.g., from at or near 0 Hertz to GHz). As described further herein, that circuit behavior model may be generated by combining a base function (e.g., a base function generated based on output of a high frequency simulation tool) with a correction function (e.g., a correction function that is based on output of a DC model).

Figure 2:
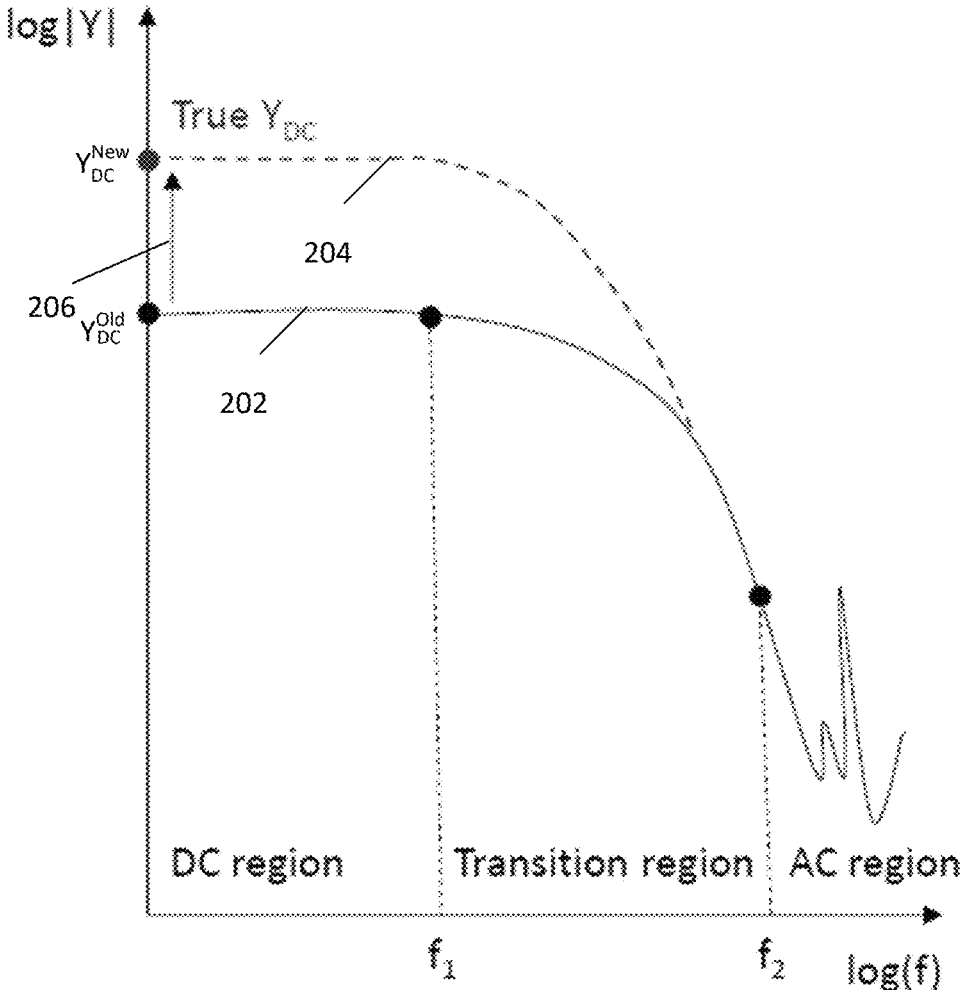
FIG. 2 is a graph illustrating an example error that may result from reliance on a base function from a high frequency solver alone to determine behavior of an electrical circuit across a range of frequencies starting at or near DC.

FIG. 2 is a graph illustrating an example error that may result from reliance on a base function from a high frequency solver alone to determine behavior of an electrical circuit across a range of frequencies starting at or near DC. The example of FIG. 2 depicts simulated behavior of a circuit in the form of its admittance across a range of frequencies. Frequencies are depicted on the x-axis using a log scale starting from 0 Hertz and traversing a first intermediate frequency $f_1$ and a second intermediate frequency $f_2$. The y-axis depicts circuit admittance magnitude ($|Y|$) on a log scale. The admittance magnitude takes into account both the real and imaginary components of the admittance of the electrical circuit at the corresponding frequency (e.g., $|Y|=\text{sqrt (real component}^2+\text{imaginary component}^2)$). The admittance output of a circuit behavior model that is formed based on output from a high frequency solver (e.g., using S-parameters from a high frequency solver) alone is shown by solid line 202, while the true admittance across the frequency solver is illustrated by dashed line 204. FIG. 2 illustrates that the circuit behavior model performs well in the AC region (i.e., above frequency $f_2$), where the output of the model is almost exactly aligned with the true circuit admittance. FIG. 2 illustrates that in a transition region between frequencies $f_1$ and $f_2$, the circuit model output deviates from the real world circuit behavior, and that in the DC region, below $f_1$, the circuit model underestimates admittance of the electrical circuit by an amount illustrated at 206.

Figure 3:
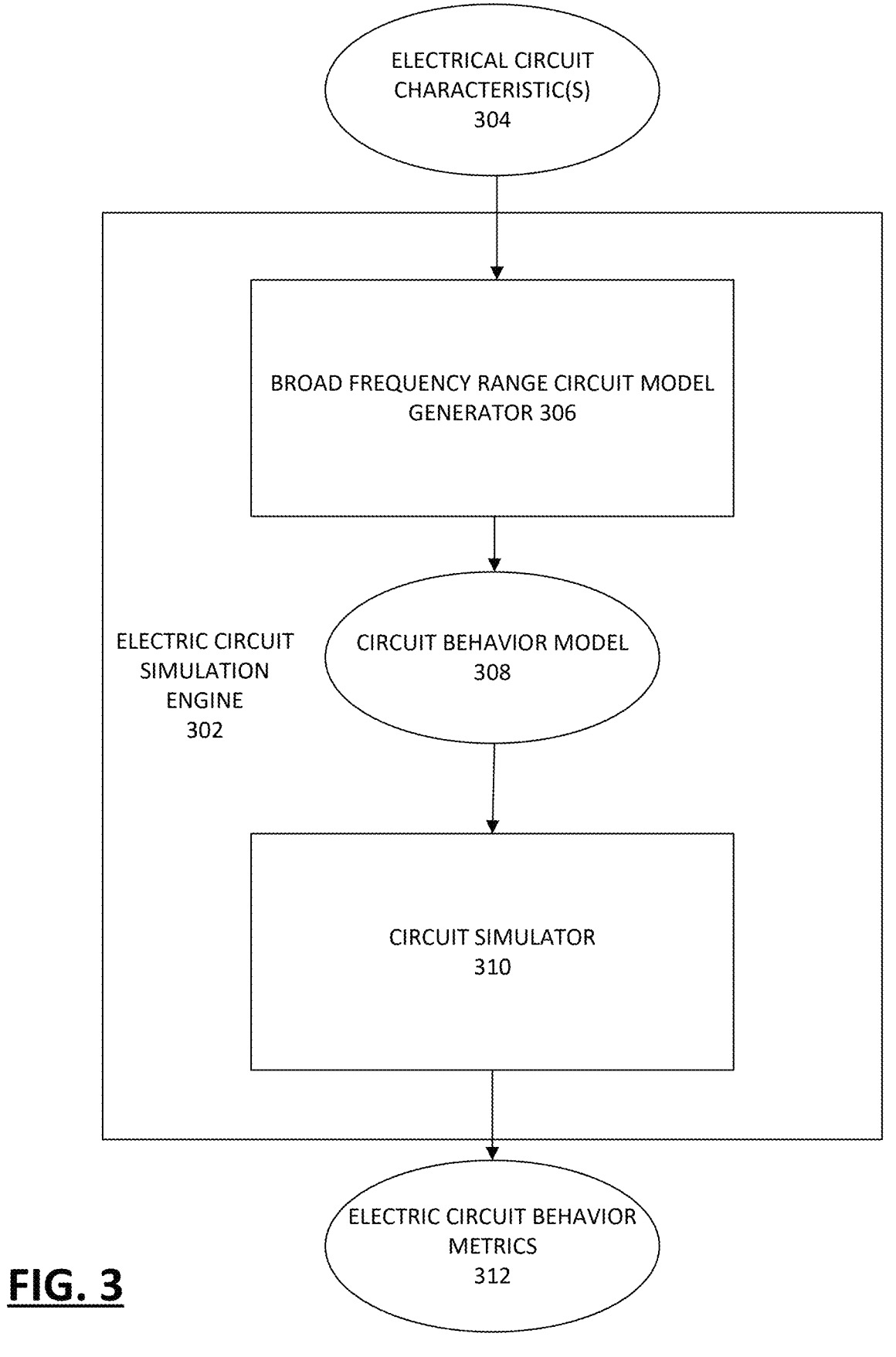
FIG. 3 is a block diagram depicting components of an electrical circuit simulation engine.

FIG. 3 is a block diagram depicting components of an electrical circuit simulation engine. An electrical circuit simulation engine 302 receives one or more characteristics 304 of an electrical circuit to be analyzed. The circuit characteristics 304 are provided to a broad frequency range circuit model generator 306 that generates a circuit behavior model 308 that, embodiments, provides improved accuracy of simulation across a range of frequencies spanning from at or near DC to high frequencies (i.e., $f_0$ to $f_{max}$, where in embodiments $f_0$ equals 0 Hertz). The circuit behavior model 308 is provided to a circuit simulator 310 that performs simulates the electrical circuit using the model 308 to determine electrical circuit behavior metrics 312 (e.g., circuit admittance across the frequency range of $f_0$ to $f_{max}$. The electrical circuit can then be built or modified based on the simulated behavior (e.g., physical parameters of the electrical circuit may be redesigned or optimized to enhance the desirability of its behavior based on iterative simulation)

Figure 4:
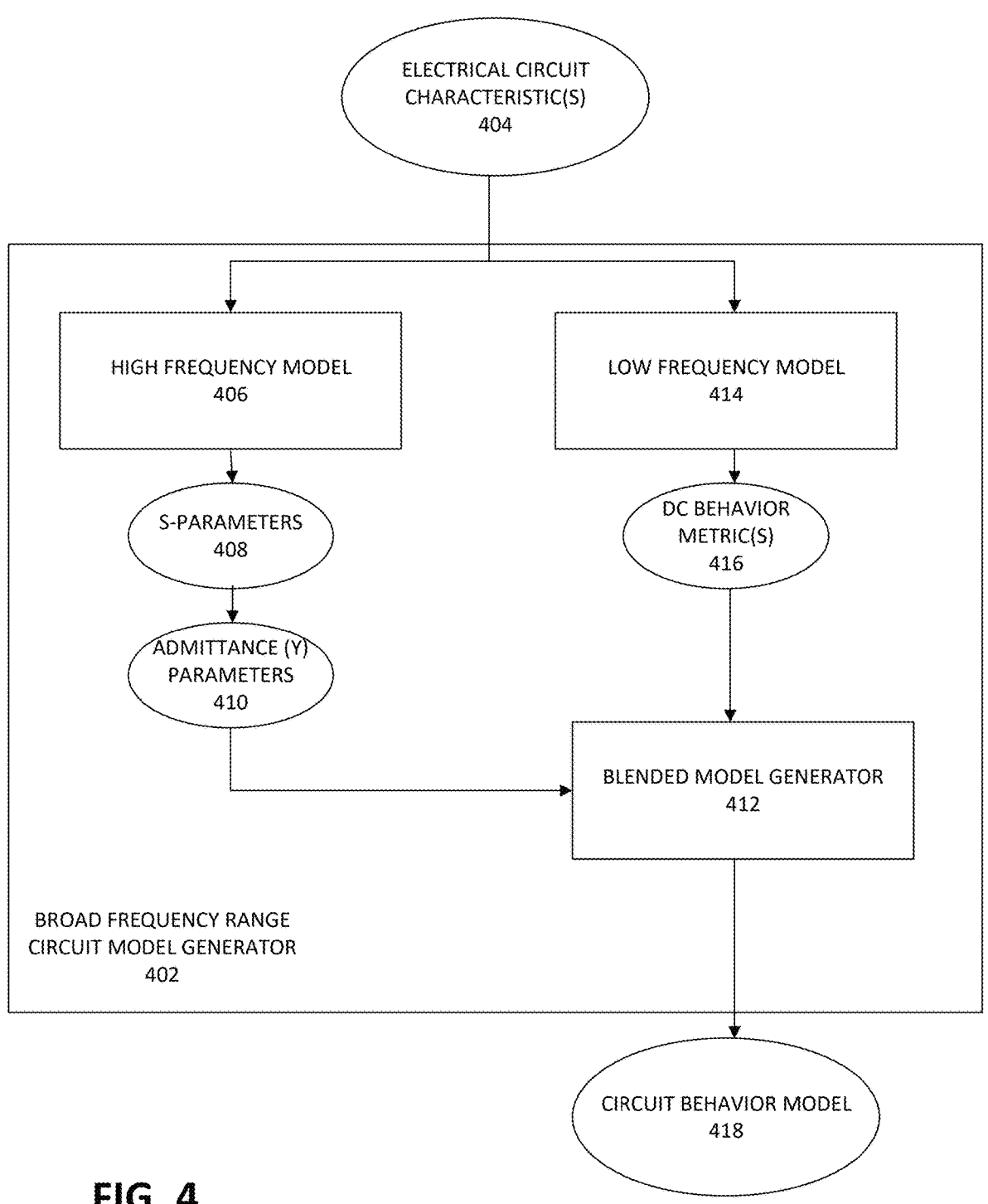
FIG. 4 is a diagram depicting details of an example broad frequency range circuit model generator.

FIG. 4 is a diagram depicting details of an example broad frequency range circuit model generator. The broad frequency range circuit model generator 402 receives one or more electrical circuit characteristics 404. The circuit characteristics 404 are provided to a high frequency model 406 that provide data 408 that characterizes the behavior of the electrical circuit at high frequencies. In the example of FIG. 4, the high frequency outputs data in the form of S-parameters (e.g., scattering parameters that describe the electrical behavior of the electrical circuit when undergoing various steady state stimuli by electrical signals). In the embodiment of FIG. 4, those S-parameters 408 are converted to admittance parameters (e.g., Y-parameters in the form of short circuited admittance parameters that describe the behavior of the electrical circuit having a number of ports, where a port is a pair of electrical terminals that carry equal and opposite current into and out of the network, having a particular voltage between them). Conversion of S-Parameters to Y-Parameters can be performed in a number of ways including according to:

$$Y = \sqrt{y}(1_N - S)(1_N + S)^{-1}\sqrt{y}$$
$$= \sqrt{y}(1_N + S)^{-1}(1_N - S)\sqrt{y}$$

The admittance parameters are provided to the blended model generator 412 as a base function that outputs magnitudes (e.g., admittance magnitudes) across a range of frequencies (e.g., from $f_0$ to $f_{max}$).

In parallel with (or before or after in time) determination of the admittance parameters 410, certain or all of the electrical circuit characteristics 404 are provided to a low frequency model 414. The low frequency model 414 outputs data 416 characterizing behavior the electrical circuit at low frequencies, at or near 0 Hertz. That data 416 is provided to the blended model generator 412 as a correction function that outputs magnitudes (e.g., admittance magnitudes across the range of frequencies). The correction model may take a variety of forms. In examples, the correction function is a zero mean function or a combination of multiple zero mean functions. In examples, the correction function may include one or more Cauchy pulse functions or one or more Gaussian pulse functions (e.g., pairs of functions to achieve zero mean behavior).

Having both the base function and the correction function, the blended model combines those functions to generate a circuit behavior model 418 that provides magnitudes (e.g., admittance magnitudes) across the range of frequencies for use in simulation of the behavior of the electrical circuit. In one example, that combination is performed according to the following:

$$Y^{Model}(0, f_{max}) = Y^{AC}(0, f_{max}) + Y^{Correction}(0, f_{max}),$$

where $Y^{Model}$ is the circuit behavior model, $Y^{AC}$ is the base function, $Y^{Correction}$ is the correction function, and $(0, f_{max})$ is the range of frequencies.

Figure 5:
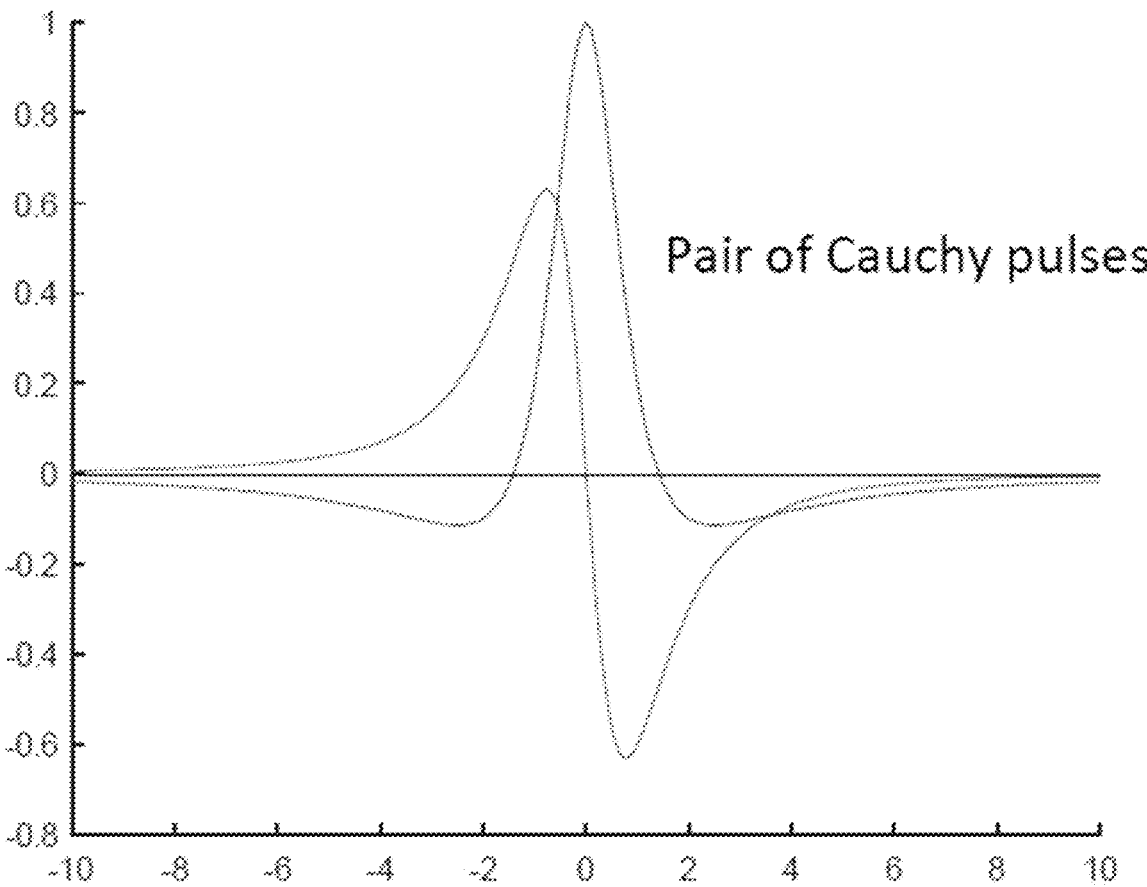
FIG. 5 is a diagram depicting an example pair of zero mean Cauchy pulses.

As noted above, the correction function representing low frequency behavior of the electrical circuit may take a variety of forms. In one example, the correction form takes the form of a pair of zero mean Cauchy pulses. FIG. 5 is a diagram depicting an example of the limit of a normalized zero mean Cauchy pulse pair when $f_a$ approaches $f_b$, and its negative Hilbert transform. This pulse pair is defined so as to correct low frequency (e.g., at 1 Hertz, 50 Hertz) resistive and inductive behavior of the electrical circuit. The by definition causal correction function consisting of a pair of Cauchy pulses is defined as:

$$Y^{Correction} = Y^{Correction,Real} + j * Y^{Correction,Imaginary}, \text{ where:}$$

$$Y_{real}^{Correction}(0, f_{max}) = \frac{y_a}{\left(1 + \left(\frac{f}{f_a}\right)^2\right)} - \frac{y_b}{\left(1 + \left(\frac{f}{f_b}\right)^2\right)},$$

$$Y_{imag}^{Correction}(0, f_{max}) = -\frac{y_a\left(\frac{f}{f_a}\right)}{\left(1 + \left(\frac{f}{f_a}\right)^2\right)} + \frac{y_b\left(\frac{f}{f_b}\right)}{\left(1 + \left(\frac{f}{f_b}\right)^2\right)}.$$

Consequently, the correction of the admittance at DC $(\Delta Y^{real})$ is $$\Delta Y^{real} = y_a - y_b$$

where those parameters $y_a$, $y_b$, $f_a$ and $f_b$ are restricted so as to provide a zero mean according to:

$$\frac{y_a}{y_b} = \frac{f_b}{f_a}.$$

Thus:

$$y_a = \frac{\Delta Y^{real}}{1 - \frac{f_a}{f_b}} \text{ and } y_b = \frac{\Delta Y^{real}}{\frac{f_b}{f_a} - 1}.$$

The correction function can then be generated through selection of $f_a$ and $f_b$.

In an embodiment, when the DC admittance matrix is rank deficient by one, $f_a$ and $f_b$ are selected for each admittance matrix element according to:

$$f_{ij,b} \rightarrow \arg\left(Y_{ij}^{AC}(f_{ij,b})\right) = \frac{\pi}{4} \text{ and } f_{ij,a} = f_{ij,b}\frac{Y_{ij,DC}^{Old}}{Y_{ij,DC}^{New}} \text{ for } i \neq j$$

$$Y_{ij,real}^{Correction} = \frac{Y_{ij,DC}^{New}}{\left(1 + \left(\frac{f}{f_{ij,a}}\right)^2\right)} - \frac{Y_{ij,DC}^{Old}}{\left(1 + \left(\frac{f}{f_{ij,b}}\right)^2\right)}$$

In embodiments, $f_a$ and $f_b$ are determined for each off-diagonal y-element individually. Diagonal y-elements are corrected by subtracting the sum of all off-diagonal corrections in a row according to:

$$Y_{ii}^{Correction} = -\sum_{k}^{k \neq i} Y_{ik}^{Correction}$$

For negative $f_{ij,a}$ (e.g., where $$Y_{ij,DC}^{New}$$

and $$Y_{ij,DC}^{Old}$$

have an opposite sign), use $f_{ij,a} = |f_{ij,a}|$ and determine coefficients via:

$$y_{ij,a} = \frac{Y_{ij,DC}^{New} - Y_{ij,DC}^{Old}}{1 - \frac{f_{ij,a}}{f_{ij,b}}} \text{ and } y_{ij,b} = \frac{Y_{ij,DC}^{New} - Y_{ij,DC}^{Old}}{\frac{f_{ij,b}}{f_{ij,a}} - 1}.$$

In an embodiment, a summation of Cauchy pulse pairs may be used for correction according to:

$$Y_{real}^{Correction} =$$

$$\sum_{k}\left(\frac{y_{a,k}}{\left(1 + \left(\frac{f}{f_{a,k}}\right)^2\right)} - \frac{y_{b,k}}{\left(1 + \left(\frac{f}{f_{b,k}}\right)^2\right)}\right) \text{ with } \sum_{k}(y_{a,k} - y_{b,k}) = \Delta Y_{real},$$

$$Y_{imag}^{Correction} =$$

$$-\sum_{k}\left(\frac{y_{a,k}\left(\frac{f}{f_{a,k}}\right)}{\left(1 + \left(\frac{f}{f_{a,k}}\right)^2\right)} - \frac{y_{b,k}\left(\frac{f}{f_{b,k}}\right)}{\left(1 + \left(\frac{f}{f_{b,k}}\right)^2\right)}\right) \text{ with } \sum_{k}(-f_{a,k}y_{a,k} + f_{b,k}y_{b,k}) = 0.$$

For example, the parameters $f_{b,k}$ and $y_{b,k}$ can be obtained for each admittance matrix element with a rational fit of the frequency data describing $Y^{AC}(0, f_2)$ as shown by line 202 in FIG. 2 from DC up to the frequency $f_2$ marking the upper end of the transition region. A similar operation can be performed for each $f_{a,k}$ and $y_{a,k}$ to construct $$f_{ij,a,k} = f_{ij,b,k}\frac{Y_{ij,DC}^{Old}}{Y_{ij,DC}^{New}} \text{ for } i \neq j \text{ and}$$

$$y_{ij,a,k} = y_{ij,b,k}\frac{Y_{ij,DC}^{New}}{Y_{ij,DC}^{Old}} \text{ for } i \neq j.$$

In such an instance using k pairs of pulses, a system may realize improved fit in the transition region that accommodate more complex topologies.

In some examples, when the DC admittance matrix is rank deficient by more than one, $$\text{i.e.} \sum_{k}^{k \neq i} Y_{ik}^{DC} \neq -Y_{ii}^{DC},$$

the maximum number of independent correction functions is limited to (rank+1)rank/2 in order to maintain the topology of the true DC network (Y-matrix) for the entire frequency range. Elements with the smallest Y values take precedence, resulting in better quality S- and Z-parameters. Other correction functions are linear combinations of the independent correction functions obtained from the null-space vectors of $Y_{DC}$. Alternative, a single correction function for the entire Y-matrix may be used for simplicity.

Figure 6:
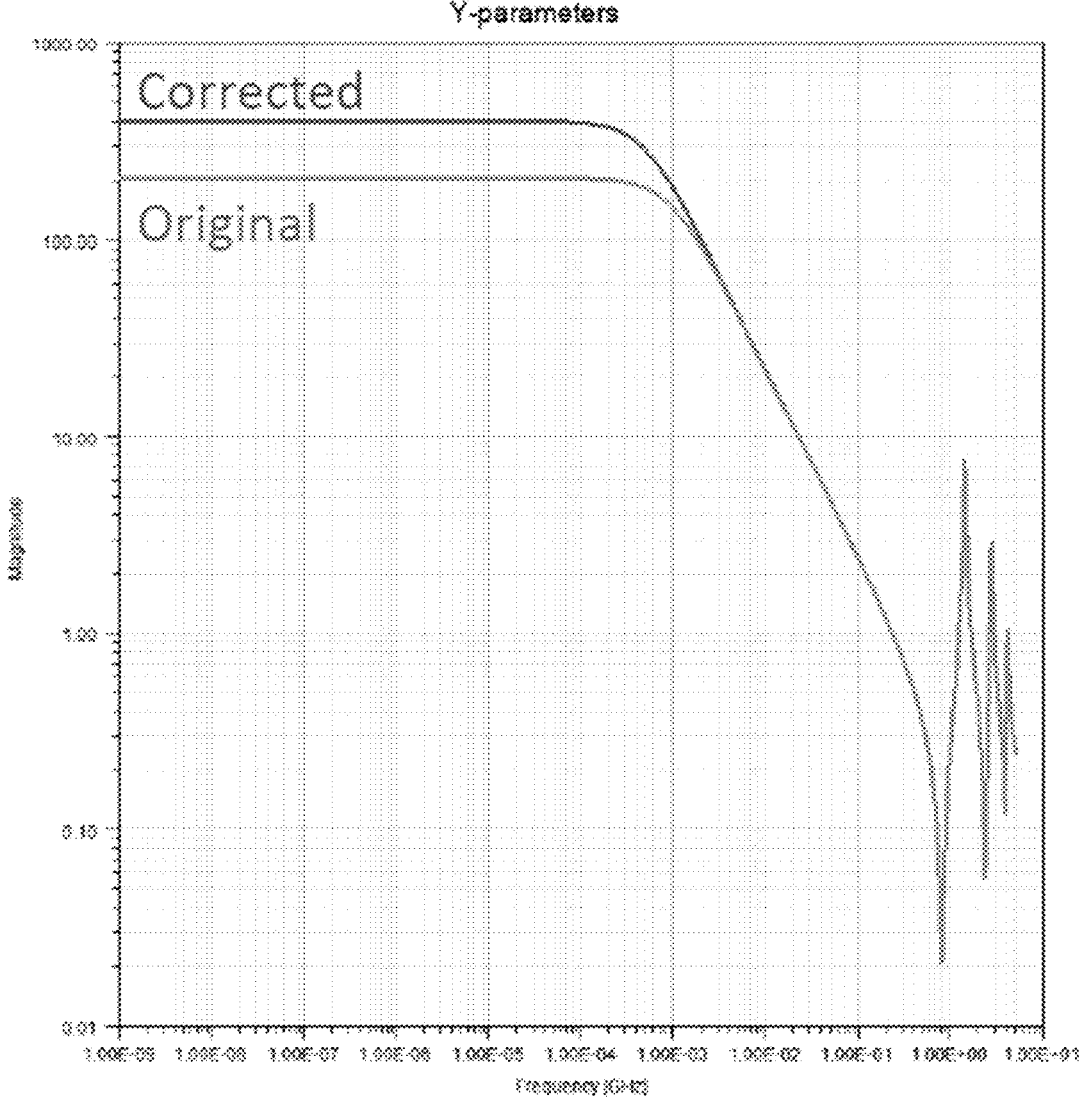
FIG. 6 is a diagram depicting a plot of an output of a base function, a circuit behavior model generated using the base function and a correction function, as well as a measured behavior of the electrical circuit.

FIG. 6 is a diagram depicting a plot of an output of a base function, a circuit behavior model generated using the base function and a correction function, as well as a measured behavior of the electrical circuit. The measured output is not independently visible in FIG. 6 because the circuit behavior model output (labeled Corrected) is directly on top of the measured result, indicated a high degree of accuracy. The plot labeled Original depicts the base function output. While the base function output is significantly aligned with the measured result at high frequencies, it's admittance magnitude output is materially below the measured result at lower frequencies (e.g., below 10 Hertz). The circuit behavior model plot, labeled Corrected, is directly aligned with the measured result throughout the entirety of the frequency span from near 0 Hertz DC to high frequency. The circuit behavior model is generated by combining the base function based on output from the high frequency simulation tool with the correction function that is generated based on output from the DC model.

Figure 7:
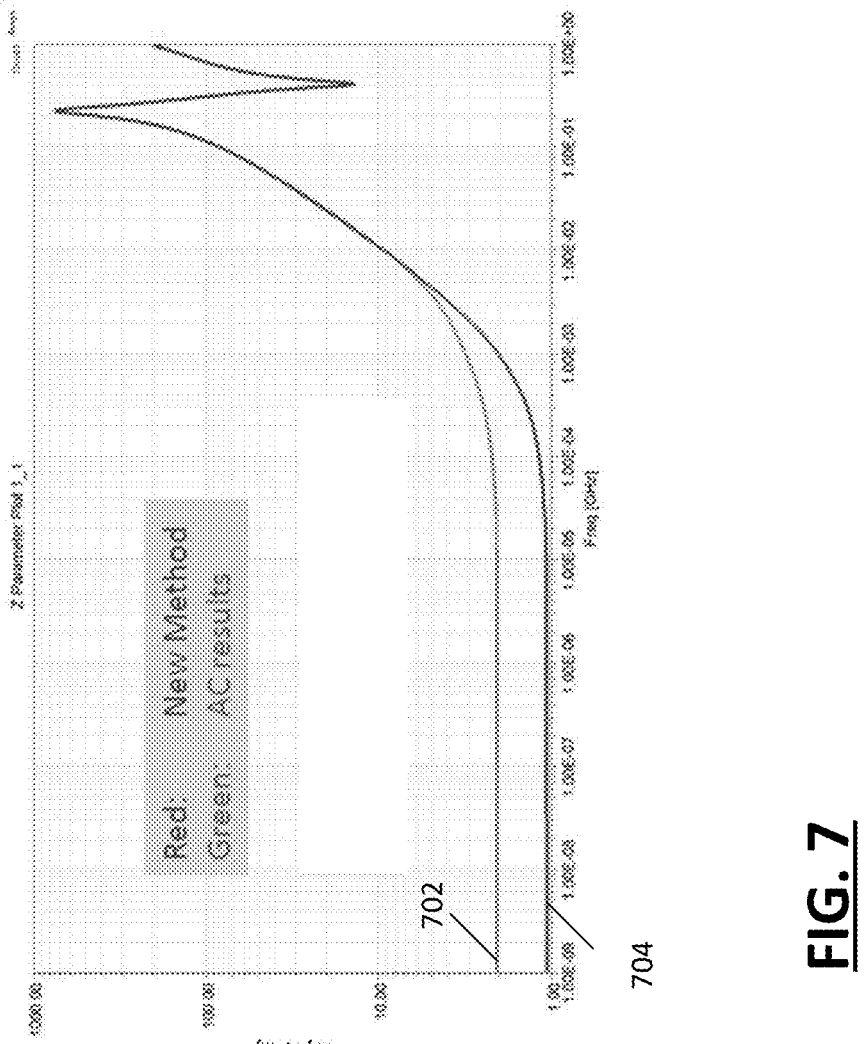
FIG. 7 is a diagram depicting an example use case for an electrical circuit simulation engine.

FIG. 7 is a diagram depicting an example use case for an electrical circuit simulation engine. In FIG. 7, the electrical circuit takes the form of a printed circuit board having ports connected between Power and Ground. The green plot 702 indicates output generated based only on data from a high frequency simulation tool. The red plot 704 indicates output of a circuit behavior model generated based on a base function generated based on a high frequency simulation tool output in combination with a correction function as described herein. The circuit behavior model plot 704 is aligned with a real world measured result across the entirety of the frequency range detected, such that the real world measured result is not visible in FIG. 7. The base function plot alone 702 is well aligned with the real world measurements at high frequencies, but shows an error amount from the plots overlapping at 704 at low frequencies near DC. The circuit behavior model in this example exhibits causality and passivity, providing confidence that its determinations are well in line with the physics of the system.

FIG. 8 is a flow diagram depicting example steps of a computer-implemented method for simulating behavior of an electrical circuit across a range of frequencies from 0 to $f_{max}$. At 802, base function is determined that outputs magnitudes across the range of frequencies. At 804, correction function is determined that outputs magnitudes across the range of frequencies. The base function is combined with the correction function to generate a circuit behavior model that provides magnitudes across the range of frequencies at 806, and at 808, behavior of the electrical circuit is simulated using the circuit behavior model.

Figures 9A, 9B:
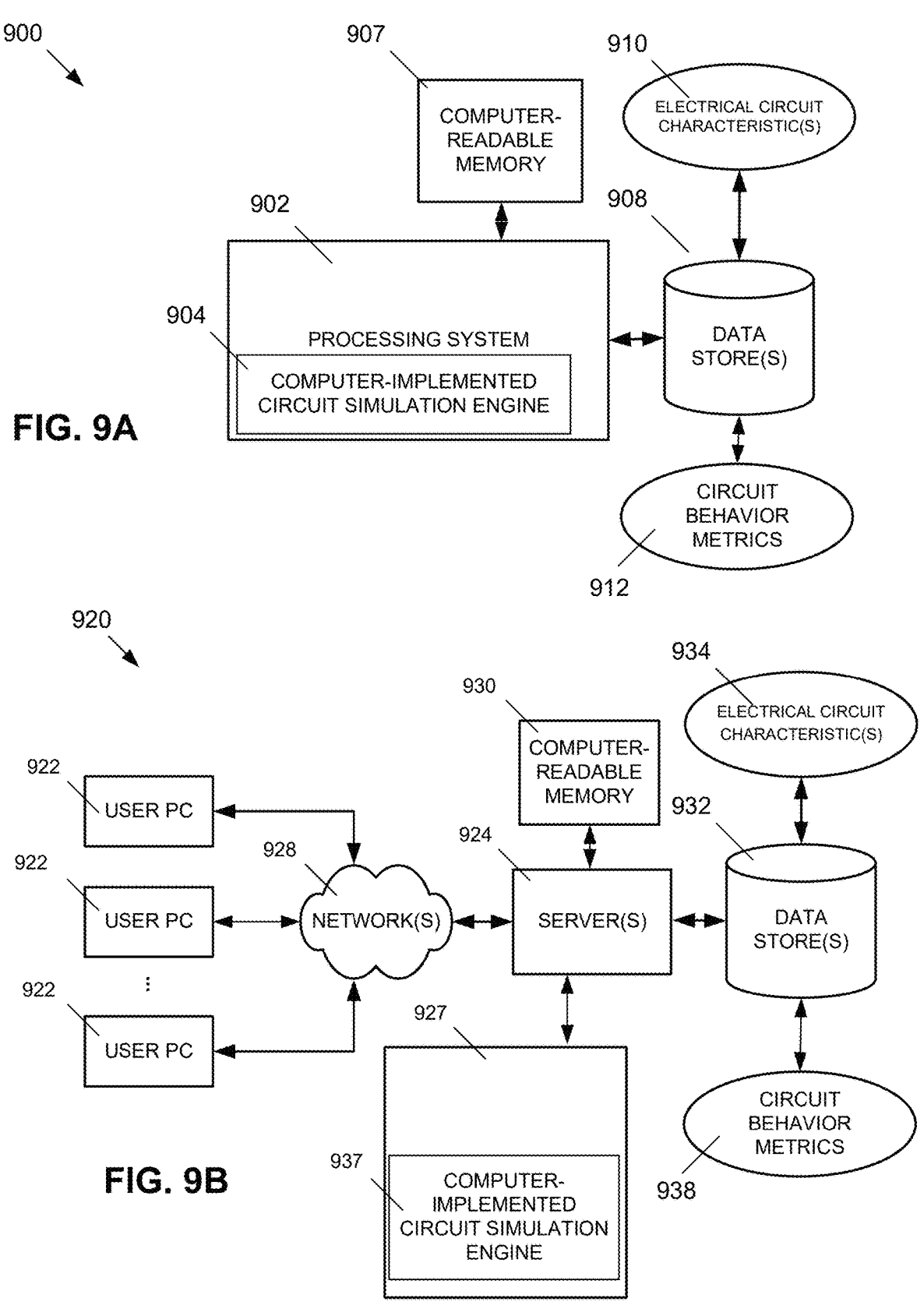
FIGS. 9A, 9B, and 9C depict example systems for implementing the approaches described herein for simulating operation of a physical system.
Figure 9C:
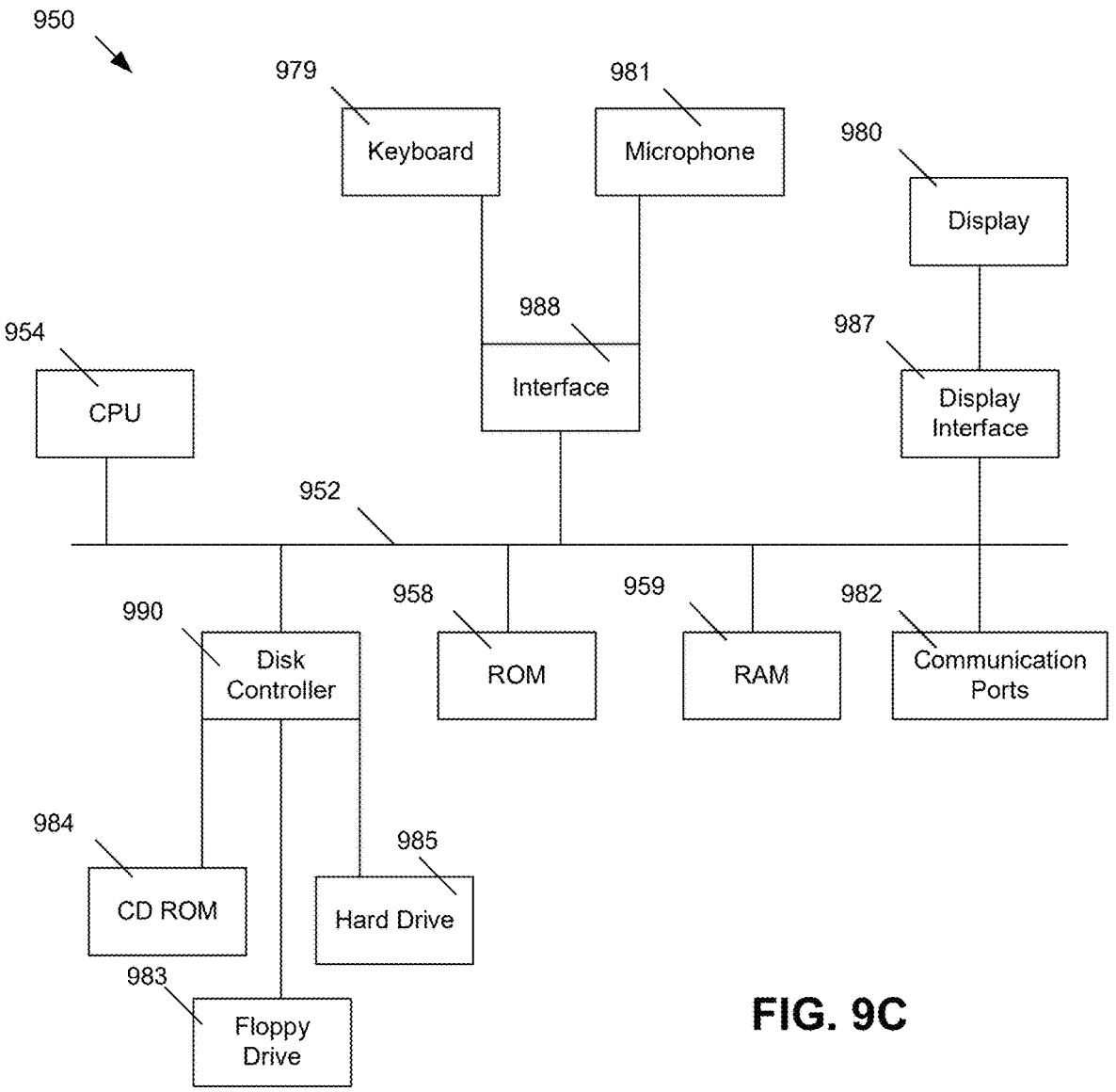

FIGS. 9A, 9B, and 9C depict example systems for implementing the approaches described herein for simulating behavior of an electrical system. For example, FIG. 9A depicts an exemplary system 900 that includes a standalone computer architecture where a processing system 902 (e.g., one or more computer processors located in a given computer or in multiple computers that may be separate and distinct from one another) includes a computer-implemented circuit simulation engine 904 being executed on the processing system 902. The processing system 902 has access to a computer-readable memory 907 in addition to one or more data stores 908. The one or more data stores 908 may include electrical circuit characteristics 910 as well circuit behavior metrics 912. The processing system 902 may be a distributed parallel computing environment, which may be used to handle very large-scale data sets.

FIG. 9B depicts a system 920 that includes a client-server architecture. One or more user PCs 922 access one or more servers 924 a computer-implemented circuit simulation engine 937 on a processing system 927 via one or more networks 928. The one or more servers 924 may access a computer-readable memory 930 as well as one or more data stores 932. The one or more data stores 932 may include electrical circuit characteristics 934 as well as circuit behavior metrics 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for providing electrical circuit simulation. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984, 988 may include one or more data structures for storing and associating various data used in the example systems. For example, a data structure stored in any of the aforementioned locations may be used to store data from XML files, initial parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for simulating behavior of an electrical circuit across a range of frequencies from 0 to $f_{max}$, comprising:

determining a base function that outputs magnitudes across the range of frequencies;

determining a correction function that outputs magnitudes across the range of frequencies, wherein the correction function comprises a rank deficient DC admittance matrix;

combining the base function with the correction function to generate a circuit behavior model that provides magnitudes across the range of frequencies; and simulating behavior of the electrical circuit using the circuit behavior model.

2. The method of claim 1, further comprising:

providing a characteristic of the electrical circuit to a high frequency simulation tool to determine the base function; and providing the characteristic of the electrical circuit to a DC model to determine a DC value;

wherein the correction function is determined based on the DC value.

3. The method of claim 2, wherein the high frequency simulation tool provides S-parameters;

wherein determining the base function comprises converting the S-parameters from the high frequency simulation tool to admittance parameters.

4. The method of claim 1, wherein the circuit behavior model utilizes a function comprising:

$$Y^{Model}(0, f_{max}) = Y^{AC}(0, f_{max}) + Y^{Correction}(0, f_{max}),$$

where $Y^{Model}$ is the circuit behavior model, $Y^{AC}$ is the base function, $Y^{Correction}$ is the correction function, and $(0, f_{max})$ is the range of frequencies.

5. The method of claim 1, wherein the correction function further comprises a zero mean function or a combination of multiple zero mean functions.

6. The method of claim 5, wherein the correction function further comprises a Cauchy pulse function or a Gaussian pulse function.

7. The method of claim 1, wherein the correction function further comprises one or more pairs of Cauchy pulse functions.

8. The method of claim 1, wherein the circuit behavior model exhibits causality and passivity relative to the electrical circuit.

9. The method of claim 1, wherein the electrical circuit is built or modified based on results of the simulation.

10. A computer-implemented system for simulating behavior of an electrical circuit across a range of frequencies from 0 to $f_{max}$, comprising:

one or more data processors;

a computer-readable medium encoded with instructions for commanding the one or more data processors to execute steps that comprise:

determining a base function that outputs magnitudes across the range of frequencies, wherein the correction function comprises a rank deficient DC admittance matrix;

determining a correction function that outputs magnitudes across the range of frequencies;

combining the base function with the correction function to generate a circuit behavior model that provides magnitudes across the range of frequencies; and simulating behavior of the electrical circuit using the circuit behavior model.

11. The system of claim 10, wherein the steps further comprise:

providing a characteristic of the electrical circuit to a high frequency simulation tool to determine the base function; and providing the characteristic of the electrical circuit to a DC model to determine a DC value;

wherein the correction function is determined based on the DC value.

12. The system of claim 11, wherein the high frequency simulation tool provides S-parameters;

wherein determining the base function comprises converting the S-parameters from the high frequency simulation tool to admittance parameters.

13. The system of claim 10, wherein the circuit behavior model utilizes a function comprising:

$$Y^{Model}(0, f_{max}) = Y^{AC}(0, f_{max}) + Y^{Correction}(0, f_{max}),$$

where $Y^{Model}$ is the circuit behavior model, $Y^{AC}$ is the base function, $Y^{Correction}$ is the correction function, and $(0, f_{max})$ is the range of frequencies.

14. The system of claim 10, wherein the correction function further comprises a zero mean function or a combination of multiple zero mean functions.

15. The system of claim 14, wherein the correction function further comprises a Cauchy pulse function or a Gaussian pulse function.

16. The system of claim 10, wherein the correction function further comprises one or more pairs of Cauchy pulse functions.

17. The system of claim 10, wherein the circuit behavior model exhibits causality and passivity relative to the electrical circuit.

18. The system of claim 10, wherein the electrical circuit is built or modified based on results of the simulation.

19. A computer-readable medium encoded with instructions for commanding one or more data processors to execute steps of a method for simulating behavior of an electrical circuit across a range of frequencies from 0 to $f_{max}$, the steps comprising:

determining a base function that outputs magnitudes across the range of frequencies;

determining a correction function that outputs magnitudes across the range of frequencies, wherein the correction function comprises a DC admittance matrix that is rank deficient by one;

combining the base function with the correction function to generate a circuit behavior model that provides magnitudes across the range of frequencies; and simulating behavior of the electrical circuit using the circuit behavior model.

20. The computer readable medium of claim 19, wherein the steps further comprise:

providing a characteristic of the electrical circuit to a high frequency simulation tool to determine the base function; and providing the characteristic of the electrical circuit to a DC model to determine a DC value;

wherein the correction function is determined based on the DC value.

\* \* \* \* \*